Aug. 30, 1960
R. L. SCHWOEBEL
2,950,881
BALLOON AND GONDOLA ASSEMBLY
Filed April 16, 1956
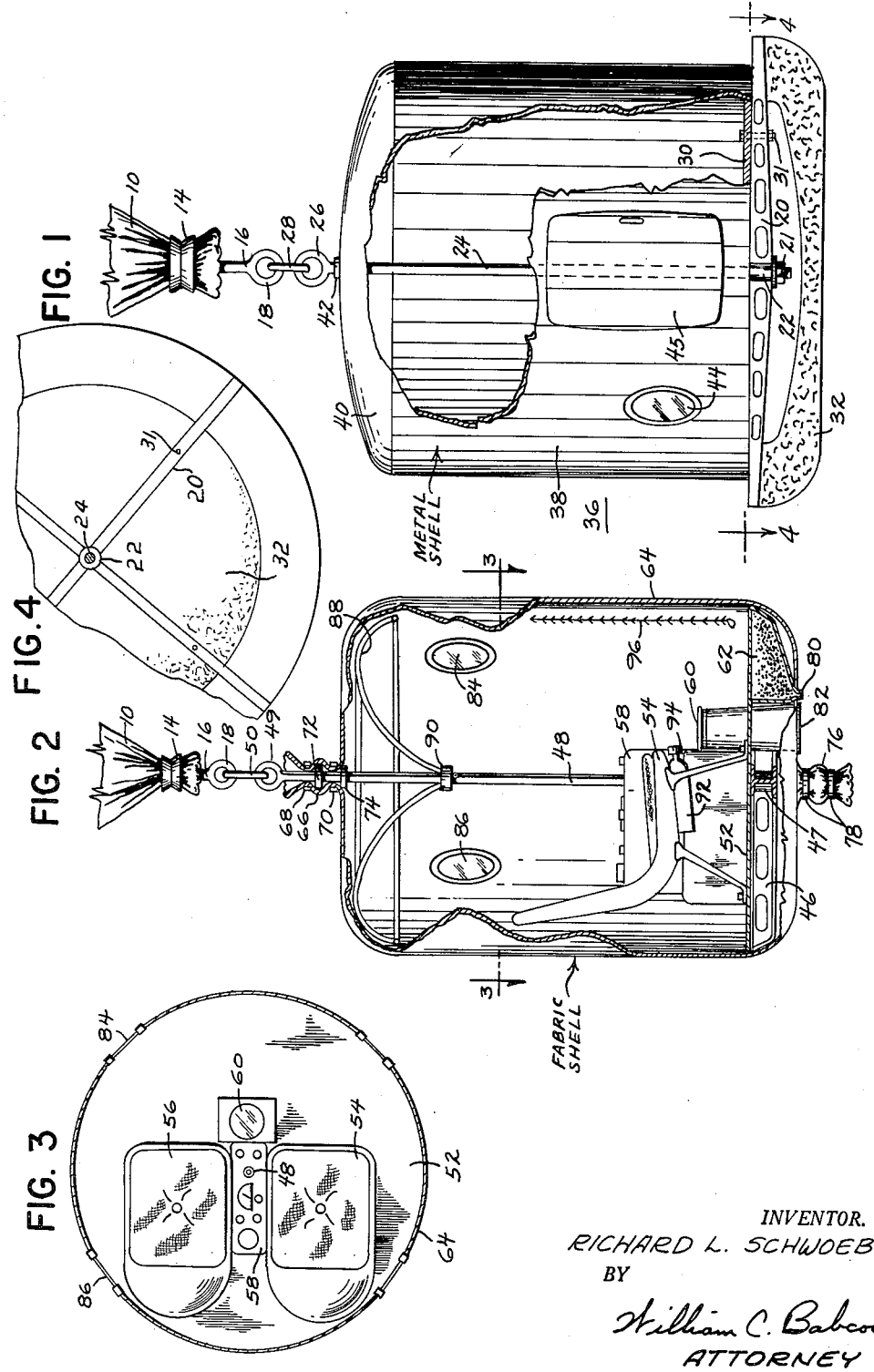
INVENTOR.
RICHARD L. SCHWOEBEL
BY
William C. Babcock
ATTORNEY United States Patent Office 2,950,881
Patented Aug. 30, 1960

2,950,881

BALLOON AND GONDOLA ASSEMBLY

Richard L. Schwoebel, Minneapolis, Minn., assignor to General Mills, Inc., a corporation of Delaware Filed Apr. 16, 1956, Ser. No. 578,528

2 Claims. (Cl. 244—31)

The present invention relates to balloons and more particularly to an improved balloon gondola assembly for high altitude manned flights.

In the balloon field there has been considerable activity in recent years in connection with upper atmosphere research. Balloons are known which have been utilized for free flight to altitudes in the stratosphere. In the past, these high altitude flights have been essentially limited to the transportation of small animals and instruments. While instruments can measure a number of conditions and can in suitable cases telemeter the measured information back to a ground station, there are other situations where the presence of a human operator would be desirable.

As far as I am aware, however, the possibility of successful manned flights at higher altitudes has been severely limited by a number of factors. One of the chief factors has been the lack of a suitable gondola construction to support such a passenger in safety and comfort. Known gondola constructions have previously involved a rigid shell of sufficient thickness and strength to carry the full weight of passenger and payload, as well as to provide a pressurized chamber for the passenger. Such constructions are relatively so bulky and heavy that they severely limit the altitudes and payloads which can be achieved in practice.

It is accordingly one object of the present invention to provide an improved gondola assembly for high altitude manned balloon flights.

A further object is a balloon gondola which insures comfort and safety for the passenger with minimum weight, by provision of separate members for the respective supporting and protective functions of the gondola.

Another object is a balloon gondola construction in which a passenger is enclosed within a pressurized flexible fabric shell, which serves solely to provide the desired protective enclosure without contributing to the support of the passenger or other load.

Other objects and advantages of the present invention will be apparent from the following specification in which certain prefered embodiments of the invention are described with particular reference to the accompanying drawings.

In the drawings, wherein like reference characters indicate like parts,

Fig. 1 is a side view of a gondola assembly according to the present invention, with portions broken away for clearness, and with the gondola connected to the lower end of a balloon or lifting cell.

Fig. 2 is a side view of another embodiment of the invention, adapted to carry two passengers.

Fig. 3 is a sectional view of the gondola of Fig. 2, taken on the line 3—3 of Fig. 2.

The gondola assembly of the present invention is used with a balloon or lifting cell of known construction, the bottom of which is shown in Fig. 1. Here the lifting cell is designated generally at 10. Its lower end is secured by a suitable end fitting 14 which provides a load attachment shaft 16. A loop or ring 18 at the lower end of this shaft provides means for attachment of the gondola assembly.

One important concept of the present invention is the separation of functions of the gondola, so that the load bearing or support function can be carried out by the use of rigid members which need serve no other purpose. Similarly the shell construction can be made of suitable materials and assembled in a fashion to provide only the desired protective function with no supporting effect. In this manner an extremely light and efficient gondola construction can be achieved without loss of essential safety or protection for the operator.

In this case the load bearing and passenger supporting portion of the gondola includes a rigid keel structure having one or more supporting beams or member 20 at the base of the gondola. Beams 20 extend horizontally and are secured by a nut 21 to the lower end 22 of a vertical rigid keel support 24. This support member 24 extends vertically up through the desired gondola space and is provided at its upper end with a ring or eye bolt 26 for connection to the balloon. Thus, ring 26 may be suitably connected to the ring 18 of the balloon fitting by means of nylon cords 28 or other removable fastening means.

A suitable deck or floor member 30 is secured by bolts 31 to the top of the keel member 20 to provide a surface on which the passenger and payload elements may be carried. A suitable auxiliary support or shock absorbing frame 32 may be fastened beneath keel member 20 to support the gondola during loading and launching and to cushion the shock of landing. This frame 32 may, for example, be made of plastic foam materials.

The portions of the invention described above relate primarily to the weight-bearing and load-supporting characteristics of the gondola construction and provide means in general for attachment of the gondola beneath a suitable lifting cell for carrying the desired passenger and instrument load. In high altitude balloon flights it is also essential to protect the passenger from adverse atmospheric and other conditions by some sort of enclosing shell. While previous concepts of balloon gondola design have included the shell structure as part of the solid load-bearing portion of the gondola, the present invention separates the protective functions of the shell from the load-supporting functions of the gondola and makes it possible to provide a much lighter shell construction.

In this case, the shell construction, indicated generally at 36, involves a thin metallic rigid construction which includes sidewalls 38 and a top 40. These walls are held to each other in gas-tight relationship and are similarly secured to the deck member 30 and keel 20. The top wall 40 includes an opening 42 through which the vertical keel shaft 24 projects. The opening at 42 should also be sealed in gas-tight fashion. However, the shell portion 40 need not be actually secured against vertical movement with respect to shaft 24, since the shell is primarily supported by the rigid bottom keel member 20.

The shell walls include one or more viewing ports 44 and a suitable entrance door 45 which may be constructed in known manner. The door and viewing ports also include suitable gas seals so that the interior of the gondola, i.e., the interior of shell 36 may be maintained at a pressure designed to provide adequate comfort and freedom of movement for a human passenger at all expected altitudes. In practice, it is contemplated that interior pressure in the gondola of 4 p.s.i. (pounds per square inch) will be adequate for this purpose, in cases where the passenger is provided with a pressure suit and with his own separate oxygen supply for breathing.

In a gondola of this type with a cylindrical body portion 7 feet in diameter and 7 feet high, the walls may be constructed of thin sheet aluminum having a thickness of not more than .02 inch. Such thicknesses are substantially less than those which would be required for a shell in which the shell walls must not only provide a pressurized compartment but also support the weight of the passenger and payload. The concentration of the load supporting function in rigid keel members 20 and 24 makes it possible to construct a gondola substantially 150 to 200 pounds lighter than a standard spherical gondola of equivalent useful volume in which the upper end of the sphere is secured to the balloon and in which the walls of the sphere must carry the complete load without the presence of separate load supporting keel members such as 20 and 24 of Fig. 1.

Because the sole function of the shell portion is the protection of the passenger and not the support of the pasenger, the shell can even be made of extremely light flexible fabric material. Such a construction is shown in Figs. 2 and 3.

In this case the gondola assembly includes radially extending horizontal keel members 46 and 47 which are rigidly secured to a vertical keel member or support 48. The upper end of the vertical keel or rod 48 includes a ring 49 to be connected by nylon cords or other attachment means 50 to the load ring 18 of the lifting cell. Keel members 46 and 47 support a deck or floor 52 on which suitable seats 54 and 56 are provided for the passengers. In this case the gondola is designed to accommodate a pilot and co-pilot and the seats are balanced at opposite sides of the vertical shaft 48.

A suitable instrument console 58 is mounted on the deck between the seats so that the various instruments and controls are equally available to both passengers. A viewing tube 60 is mounted ahead of and equally spaced from the seats 54 and 56 to provide means by which either passenger may look downwardly at the ground. A suitable ballast hopper 62 is also supported by the rigid keel members and is provided with means (not shown) for discharging ballast as needed.

As indicated above, the shell portion 64 in this embodiment may be made of flexible fabric provided with a gasproof coating or liner. The fabric is preferably in the form of a cylindrical tube, the upper end of which may then be gathered at 66 and secured by clamping bands 68 and 70 around the projections 72 and 74 of a suitable fitting at the upper end of shaft 48. Such a fitting is shown and claimed in the co-pending application of Paul E. Yost, Serial No. 572,899, filed March 21, 1956, for "Balloon Load Attachment Fitting." The shell material may include a heavy nylon fabric.

The lower end of the cylindrical shell 64 may then be similarly secured at 76 by clamps 78. The attachment of the shell to the vertical keel member 48 in this manner provides a gastight closure for the ends of the shell and also serves to support the shell from the keel member 48. It will be apparent, however, that the shell itself does not carry any portion of the weight of the passenger or load. Therefore the strength of the shell material need be only great enough to support its own weight and to resist the desired internal pressures, such as those mentioned above.

Because certain elements located within the shell require access openings through the shell, it is necessary to provide gas-tight connections through which these elements can project. For example, the ballast hopper 62 requires a discharge opening 80 through the shell, while the viewing device 60 must include an opening through the shell at 82. The shell is similarly provided with other viewing openings 84 and 86 as needed.

To assist in supporting the shell and preventing its collapse around the post 48 when the shell is not pressurized, an auxiliary supporting frame 88 is secured within the top of the shell and is fastened at 90 to the vertical support shaft of the gondola. A suitable pressurizing means 92, such as a tank of compressed gas, is provided with a control handle 94 by which the desired internal pressures can be established and maintained. When the interior of the shell is pressurized, for example at 4 p.s.i., the shell will assume its normal shape, as shown in Fig. 2, and will be supported primarily by the fittings through which it is attached to the vertical shaft 48. A suitable gas-tight zipper at 96 may provide an entrance and exit opening for the passenger.

The keel members, including vertical shaft 48, can be specifically designed to support the expected loads, including passenger, under parachute loadings of the order of magnitude of 10–15 $g$ with a safety factor of at least two. In this case, $g$ is the vertical acceleration due to gravity. At the same time, the shell material need not have any greater strength than that required to resist with adequate safety, a pressure differential of the order of 4 p.s.i., i.e. an internal pressure 4 p.s.i. greater than the concurrent or anticipated external pressure.

The gondola assemblies described above substantially accomplish the objects set forth in this application and provide a construction in which the load-bearing and protective functions of the gondola are achieved by separate members or elements, each of which may be particularly designed to perform its own function without reference to the other function. In this way, a relatively simple construction is provided in which the total weight of the gondola assembly is substantially less than known gondolas of equivalent volume and which can therefore be used for successful flights at higher altitudes, or with greater payloads, or both. Since many variations and changes in the exact details of construction will be apparent to persons skilled in this field, it is intended that this invention shall cover all such changes and modifications as fall within the spirit and scope of the foregoing description and the attached claims.

Now, therefore, I claim:

1. A balloon gondola for high altitude manned flight including in combination, a rigid keel means, a passenger supporting surface mounted on said keel means, an attaching means secured to said keel means centrally thereof and normal thereto, a substantially gas-tight shell secured to said attaching means at an upper portion thereof and to said supporting surface and keel means for enclosing a passenger therein, said attaching means running centrally through said gas-tight shell for attachment to a lifting cell, whereby the entire weight of the passenger is carried by said supporting surface as mounted on said keel means secured to said attaching means.

2. A balloon assembly for high altitude manned flight including in combination, a gondola having a rigid keel member, passenger support means on said keel member, a substantially gas-tight flexible partially collapsible shell secured to said keel member for enclosing said passenger support means, means for pressurizing the interior of said shell to keep it expanded, a lifting cell for lifting said gondola, and attaching means interconnecting said keel means and said lifting cell and passing through said shell, whereby the weight of the passenger is transmitted to the lifting cell through the passenger support means, keel means and attaching means.

References Cited in the file of this patent

UNITED STATES PATENTS 1,511,489    Armstrong _____ Oct. 14, 1924

FOREIGN PATENTS 740,158    Great Britain _____ Nov. 9, 1955